United States Patent
Pathak et al.

(10) Patent No.: US 10,162,717 B2
(45) Date of Patent: *Dec. 25, 2018

(54) SYNCHRONIZATION OF A DISASTER-RECOVERY SYSTEM

(71) Applicant: International Business Machines Corporation, Armonk, NY (US)

(72) Inventors: Ramesh Chandra Pathak, Bangalore (IN); Suryanarayana K. Rao, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 114 days.

This patent is subject to a terminal disclaimer.

(21) Appl. No.: 15/347,923

(22) Filed: Nov. 10, 2016

(65) Prior Publication Data

US 2017/0060704 A1    Mar. 2, 2017

Related U.S. Application Data

(63) Continuation of application No. 14/288,700, filed on May 28, 2014, now Pat. No. 9,529,880.

(51) Int. Cl.
| | |
|---|---|
| *G06F 11/00* | (2006.01) |
| *G06F 11/14* | (2006.01) |
| *G06F 17/30* | (2006.01) |

(52) U.S. Cl.
CPC .......... *G06F 11/1474* (2013.01); *G06F 11/14* (2013.01); *G06F 11/1451* (2013.01);
(Continued)

(58) Field of Classification Search
CPC ............. G06F 11/1451; G06F 11/1464; G06F 11/1469; G06F 11/1471; G06F 11/1474; G06F 17/30575
See application file for complete search history.

(56) References Cited

U.S. PATENT DOCUMENTS

| | | | |
|---|---|---|---|
| 6,539,381 B1 * | 3/2003 | Prasad | .............. G06F 17/30575 |
| 7,013,315 B1 | 3/2006 | Boothby et al. | |

(Continued)

OTHER PUBLICATIONS

Office Action (dated Feb. 12, 2016) for U.S. Appl. No. 14/288,700, filed May 28, 2014.

(Continued)

*Primary Examiner* — Elmira Mehrmanesh
(74) *Attorney, Agent, or Firm* — Schmeiser, Olsen & Watts, LLP; Mark Vallone (57) ABSTRACT

A method and associated systems for synchronizing a disaster-recovery system of a database. A processor identifies transactions that affect data blocks of a database and records each change in a vector form. For each block, the processor determines a more efficient way to communicate changes made to the block by a subset of the identified transactions. If fewer resources are needed to communicate an updated image of the entire changed block than would be needed to instead communicate a related set of change vectors that identify changes made to the block by the subset of transactions, then the processor communicates the updated image to the disaster-recovery system. Otherwise, the processor instead communicates the related change vectors to the disaster-recovery system. The processor repeats these determinations and communications for each block of the database that was changed by an identified transaction.

20 Claims, 3 Drawing Sheets

(52) U.S. Cl.
CPC ...... *G06F 11/1464* (2013.01); *G06F 11/1469* (2013.01); *G06F 11/1471* (2013.01); *G06F 17/30351* (2013.01); *G06F 17/30371* (2013.01); *G06F 17/30377* (2013.01); *G06F 17/30575* (2013.01)

(56) References Cited

U.S. PATENT DOCUMENTS

| | | |
|---|---|---|
| 7,464,113 B1 | 12/2008 | Girkar et al. |
| 7,996,363 B2 | 8/2011 | Girkar et al. |
| 8,521,695 B2 | 8/2013 | Zwilling et al. |
| 8,589,361 B2 | 11/2013 | Hu et al. |
| 9,529,880 B2* | 12/2016 | Pathak .............. G06F 17/30575 |
| 2004/0054643 A1 | 3/2004 | Vemuri et al. |
| 2004/0054644 A1 | 3/2004 | Ganesh et al. |
| 2004/0225632 A1 | 11/2004 | Benson et al. |
| 2005/0256908 A1 | 11/2005 | Yang et al. |
| 2005/0262170 A1 | 11/2005 | Girkar et al. |
| 2006/0047713 A1* | 3/2006 | Gornshtein ....... G06F 17/30575 |
| 2006/0106881 A1 | 5/2006 | Leung et al. |
| 2010/0153419 A1* | 6/2010 | Daum ............... G06F 17/30575 707/758 |
| 2010/0211554 A1 | 8/2010 | Reid et al. |
| 2011/0295802 A1 | 12/2011 | Parham et al. |
| 2012/0030508 A1 | 2/2012 | Vivian et al. |
| 2012/0059792 A1 | 3/2012 | Kundu et al. |
| 2015/0120659 A1 | 4/2015 | Srivastava et al. |
| 2015/0347546 A1 | 12/2015 | Pathak et al. |

OTHER PUBLICATIONS

Amendment (dated Feb. 26, 2016) for U.S. Appl. No. 14/288,700, filed May 28, 2014.
Office Action (dated Jun. 3, 2016) for U.S. Appl. No. 14/288,700, filed May 28, 2014.
Amendment (dated Jun. 28, 2016) for U.S. Appl. No. 14/288,700, filed May 28, 2014.
Notice of Allowance (dated Aug. 24, 2016) for U.S. Appl. No. 14/288,700, filed May 28, 2014.

* cited by examiner

SYNCHRONIZATION OF A DISASTER-RECOVERY SYSTEM

This application is a continuation application claiming priority to Ser. No. 14/288,700, filed May 28, 2014, now U.S. Pat. No. 9,529,889, issued Dec. 27, 2016.

TECHNICAL FIELD

The present invention relates to synchronizing disaster-recovery systems.

BACKGROUND

A disaster-recovery system associated with a database system or with a other type of information-storage system must be able to efficiently monitor and record transactions that may alter its stored data.

In systems that process large numbers of transactions, this monitoring and recording can be resource-intensive. The transaction information may be so large and so complex that transferring it from a local monitoring entity to a disaster-recovery mechanism may consume large amounts of bandwidth or other resources.

BRIEF SUMMARY

A first embodiment of the present invention provides a method for synchronizing a disaster-recovery system of a database, the method comprising:

a processor of a computer system monitoring a set of transactions associated with the database, wherein the database comprises a set of data blocks, and wherein each transaction of the set of transactions identifies an alteration to one or more data blocks of the set of data blocks;

the processor choosing a subset of transactions of the set of transactions, wherein each transaction of the subset of transactions identifies an alteration to a first data block of the set of data blocks;

the processor creating a set of block images, wherein a first image of the set of block images corresponds to the first data block;

the processor generating a set of change vectors, wherein each vector of the set of change vectors corresponds to one transaction of the subset of transactions;

the processor updating the first block image as a function of changes made to the first block image by the subset of transactions;

the processor determining whether transmitting the updated first block image to the disaster-recovery system is more efficient than transmitting the set of change vectors to the disaster-recovery system;

the processor transmitting either the first block image or the set of change vectors to the disaster-recovery entity as a function of the determining.

A second embodiment of the present invention provides a computer program product, comprising a computer-readable hardware storage device having a computer-readable program code stored therein, said program code configured to be executed by a processor of a computer system to implement a method for synchronizing a disaster-recovery system of a database, the method comprising:

the processor monitoring a set of transactions associated with the database, wherein the database comprises a set of data blocks, and wherein each transaction of the set of transactions identifies an alteration to one or more data blocks of the set of data blocks;

the processor choosing a subset of transactions of the set of transactions, wherein each transaction of the subset of transactions identifies an alteration to a first data block of the set of data blocks;

the processor creating a set of block images, wherein a first image of the set of block images corresponds to the first data block;

the processor generating a set of change vectors, wherein each vector of the set of change vectors corresponds to one transaction of the subset of transactions;

the processor updating the first block image as a function of changes made to the first block image by the subset of transactions;

the processor determining whether transmitting the updated first block image to the disaster-recovery system is more efficient than transmitting the set of change vectors to the disaster-recovery system;

the processor transmitting either the first block image or the set of change vectors to the disaster-recovery entity as a function of the determining.

A third embodiment of the present invention provides a computer system comprising a processor, a memory coupled to said processor, and a computer-readable hardware storage device coupled to said processor, said storage device containing program code configured to be run by said processor via the memory to implement a method for synchronizing a disaster-recovery system of a database, the method comprising:

the processor monitoring a set of transactions associated with the database, wherein the database comprises a set of data blocks, and wherein each transaction of the set of transactions identifies an alteration to one or more data blocks of the set of data blocks;

the processor choosing a subset of transactions of the set of transactions, wherein each transaction of the subset of transactions identifies an alteration to a first data block of the set of data blocks;

the processor creating a set of block images, wherein a first image of the set of block images corresponds to the first data block;

the processor generating a set of change vectors, wherein each vector of the set of change vectors corresponds to one transaction of the subset of transactions;

the processor updating the first block image as a function of changes made to the first block image by the subset of transactions;

the processor determining whether transmitting the updated first block image to the disaster-recovery system is more efficient than transmitting the set of change vectors to the disaster-recovery system;

the processor transmitting either the first block image or the set of change vectors to the disaster-recovery entity as a function of the determining.

DETAILED DESCRIPTION

Embodiments of the present invention present a method and associated systems for optimizing a task of synchronizing a database or other system that comprises an information repository) with a disaster-recovery entity that may be called upon to back up and restore database contents after a data loss.

In order to be effective, both the database and the disaster-recovery entity must have substantially continuous access to current contents of the database or other stored data, even if those two systems are located at geographically distinct sites or do not share a real-time data connection.

In many implementations, this substantially continuous access may be provided to the database system (which may herein also refer to other types of information repositories) by a monitoring or logging mechanism that monitors or records transactions that may change stored data to the database. In such cases, the substantially continuous access may be provided to the disaster-recovery system by forwarding information on associated with the monitored or recorded transactions to the disaster-recovery system through a communications mechanism.

When a database system has many users, is subject to many transactions, or is subject to changes that comprise alterations of large amounts of data, the monitored or recorded information may grow large. In such cases, it may not be possible to communicate such information to a disaster-recovery system in a timely manner, thus raising the possibility that not all data will be available to the disaster-recovery system when a data loss occurs without warning.

It is thus an advantage of the present invention to evaluate and process the monitored or recorded information such that information communications to the disaster-recovery system is optimized to require fewer resources. Such optimized transaction information may require less communications bandwidth, storage space, processor resources, or memory usage, and may be transmitted more quickly and more often.

In this document, we will, for the sake of illustration, refer to embodiments of the present invention that optimize synchronization of a disaster-recovery system with a database system. These references do not imply a constraint on the scope of the present invention to database systems, and embodiments of the present invention may be associated with any type of system at comprises an information repository, wherein the information repository comprises data that may be changed and that must be restored in the event of a data loss.

Figure 1:
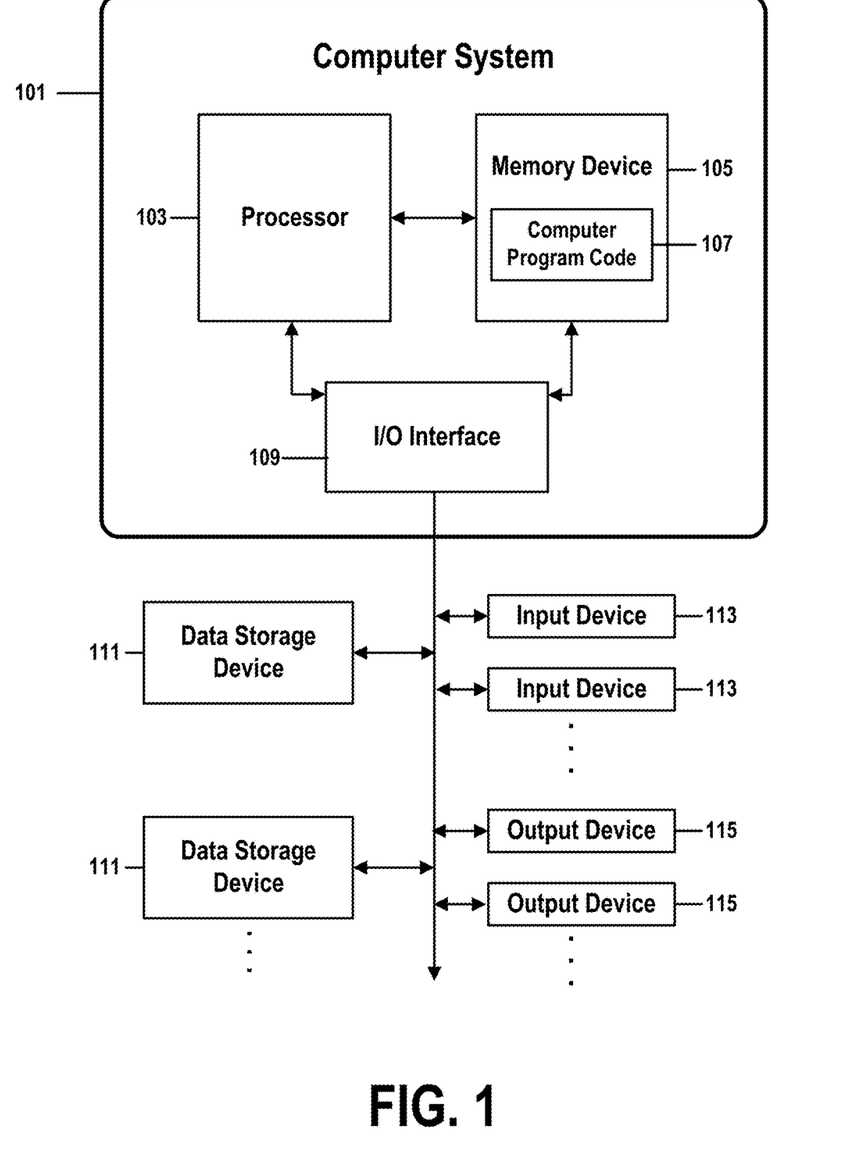
FIG. 1 shows a structure of a computer system and computer program code that may be used to implement a method for synchronizing a disaster-recovery system of a database in accordance with embodiments of the present invention.

FIG. 1 shows a structure of a computer system and computer program code that may be used to implement a method for synchronizing a disaster-recovery system of a database in accordance with embodiments of the present invention. FIG. 1 refers to objects 101-115.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product, The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). sonic alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for synchronizing a disaster-recovery system of a database in accordance with embodiments of the present invention, and may implement other embodiments described in this specification, including the methods illustrated in FIGS. 1-3. The data storage devices 111 may store the computer program code 107. Computer program code 107 stored in the storage devices 111 is configured to be executed by processor 103 via the memory devices 105. Processor 103 executes the stored computer program code 107.

Thus the present invention discloses a process for supporting computer infrastructure, integrating, hosting, maintaining, and deploying computer-readable code into the computer system 101, wherein the code in combination with the computer system 101 is capable of performing a method for synchronizing a disaster-recovery system of a database.

Any of the components of the present invention could be created, integrated, hosted, maintained, deployed, managed, serviced, supported, etc, by a service provider who offers to facilitate a method for synchronizing a disaster-recovery system of a database. Thus the present invention discloses a process for deploying or integrating computing infrastructure, comprising integrating computer-readable code into the computer system 101, wherein the code in combination with the computer system 101 is capable of performing a method for synchronizing a disaster-recovery system of a database.

One or more data storage units 111 (or one or more additional memo devices not shown in FIG. 1) may be used as a computer-readable hardware storage device having a computer-readable program embodied therein and/or having other data stored therein, wherein the computer-readable program comprises stored computer program code 107. Generally, a computer, program product (or, alternatively, an article of manufacture) of computer system 101 may comprise said computer-readable hardware storage device.

While it is understood that program code 107 for synchronizing a disaster-recovery system of a database may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., compute system 101) or to a group of central servers. Program code 107 may then be downloaded into client computers(not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for synchronizing a disaster-recovery system of a database is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

Figure 2:
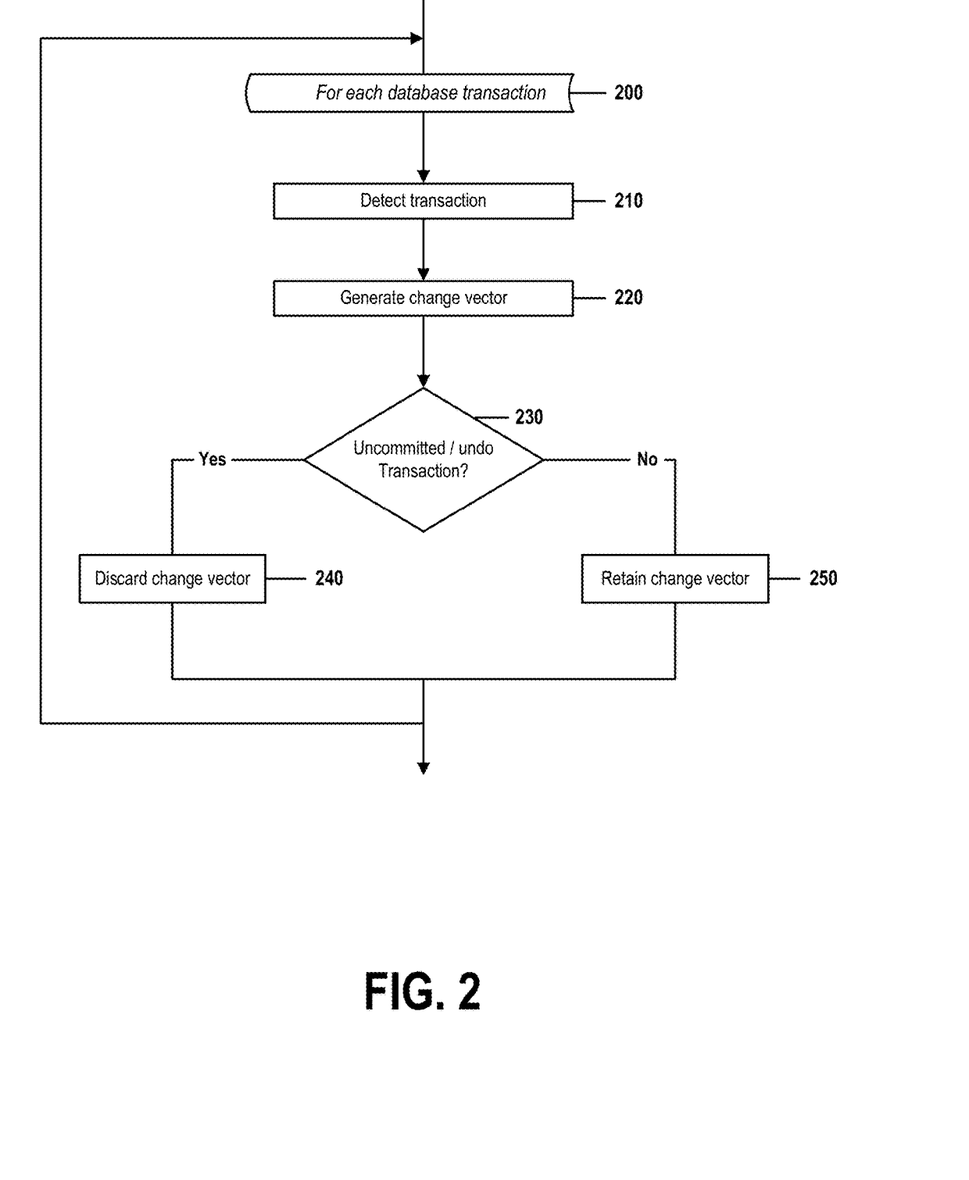
FIG. 2 is a flow chart that shows a high-level view of an embodiment of a method for synchronizing a disaster-recovery system of a database in accordance with embodiments of the present invention.

FIG. 2 is a flow chart that shows a high-level view of an embodiment of a method for synchronizing a disaster-recovery system of a database in accordance with embodiments of the present invention. FIG. 2 comprises steps 200-250.

Step 200 initiates an iterative procedure of steps 200-250, in which a processor of a computer system monitors user database transactions, generates change vectors that each identifies one transaction, and filters out transactions that do not change data stored in the database. Each iteration of this iterative procedure logs and processes one transaction.

In step 210, the processor detects a performance of a current database transaction. This procedure may be performed by means known to those skilled in the art of database maintenance, such as a transaction-logging utility comprised by a database-management application, or by middleware, system-maintenance software, or an other mechanism.

In some embodiments, each logged transaction might be identified by a unique transaction identifier or change identifier generated by the transaction-logging mechanism or by some other mechanism intrinsic to the database, the database-management system, or to a component of an embodiment of the present invention. In some embodiments, the transaction-logging mechanism may log a transaction only if that transaction alters a data block.

In step 220, the processor generates a change vector as a function of the current transaction detected in the most recent iteration of step 210.

A change vector may comprise many types of data, but in a simple embodiment of the present invention, it may comprise two elements, in any order:
i) a unique "change-vector identifier" selected as a function of a transaction identifier associated with the transaction detected in step 210. This transaction identifier may be a code that is associated with the transaction by the mechanism that originally identified the transaction; and
ii) a unique "block identifier" that identifies a data block of the database that has been affected by the current transaction. Here, a data block is a logical unit of storage maintained by the database-management system, such that the boundaries and scope of the data block are not visible to a user. If, for example, a user-visible database table comprises information stored in multiple data blocks, when a user requests a transaction that changes one record of that table, the database management system might also change contents of one or more corresponding data blocks associated with the table. In such a case, the user would see only the change to the record and would not know which blocks were altered.

In this simple example, a change vector would thus comprise an ordered pair of identifiers. In some embodiments, a change vector may further comprise other types of information that may characterize the transaction, the data block, the user activity, or an other element of the database implementation.

In some cases, a transaction may be associated with more than one change vector, such as would be the case when a single transaction changes multiple blocks, or when the single transaction performs a sequence of data changes. In such cases, a more flexible type of change-vector identifier may be selected that associates each such change vector with the single transaction.

In some embodiments, the processor may receive a change vector, rather than generate a change vector. In such embodiments, the database-management system or some component or software mechanism comprised by the database or by the database-management system, may automatically generate each change vector when identifying a corresponding transaction, or may translate logged transaction information into one or more change vectors. In such embodiments, and in other embodiments described herein, a method of the present invention, rather than generate new change vectors, may select some or all of the received change vectors to be discarded by means of logic analogous or complementary to that described below.

If the current transaction does not affect a data block, the current change vector may not specify a block identifier, or it may indicate in some other way that the transaction did not alter any data block of the database.

In step 230, the processor determines whether the current transaction, associated with the change vector generated in step 220, is of a type that may alter a data block of the database.

In one example, if the processor determines that the change vector is associated with an undo command that reversed a change to a data block that had been effected by an earlier transaction, the processor in step 230 would determine that the current transaction did not change a data block, and the method of FIG. 2 would continue with step 240. In some embodiments, the processor would further note that the earlier transaction also no longer affects a data block.

If the earlier transaction was not logged and detected by the method of FIG. 2, or if the earlier transaction is otherwise not available to the method of FIG. 2, some embodiments not conclude that the current change vector did change a data block. In such a case, both the undo operation itself which reversed a previous change to a data block, might be treated as having changed the previously changed block; and the earlier transaction, which originally effected the previous change, would also be treated as having changed the block. Such an embodiment would then continue with step 250.

In another example, the processor might, in step 230 determine that the current transaction did not change a data block because the transaction was uncommitted. An uncommitted transaction is one that has not been expressly performed. A transaction may be considered uncommitted if it was reversed by a user, if it is part of a more complex procedure that was reversed when the state of the database or of a portion of the database was rolled back to a previous state, or when the transaction could not be performed because a fault condition. Such fault conditions may, for example, include a user disconnection, an unexpected session termination, a user's failure to complete a transaction, or a hardware or software outage.

In some embodiments, the processor may, upon identifying an uncommitted transaction, further identify other transactions that are associated with the uncommitted transaction. This further identification may be performed by means known to those skilled in the art, such as selecting transactions that occurred during a specific period of time.

In step 240, if the processor determined in step 230 that the current transaction does not alter a data block, then the processor discards the current change vector. In some embodiments, if the processor in step 230 determined that other, previously generated, change vectors correspond to transactions related to the current transaction, the processor may further discard the change vectors associated with the other, previously generated, change vectors.

At the conclusion of step 240, the current iteration of the iterative process of FIG. 2 concludes and the next iteration may begin with step 200.

In step 250, if the processor determined in step 230 that the current transaction did alter a data block, then the processor retains the current change vector. At the conclusion of step 250, the current iteration of the iterative process of FIG. 2 concludes and the next iteration may begin with step 200.

The method of FIG. 2 continues in this way detecting transactions, generating change vectors, and determining which vectors to retain. Depending on embodiment details, this procedure may precede or may be performed concurrently with the method of FIG. 3, which uses the retained change vectors to synchronize the database with a disaster-recovery system.

Figure 3:
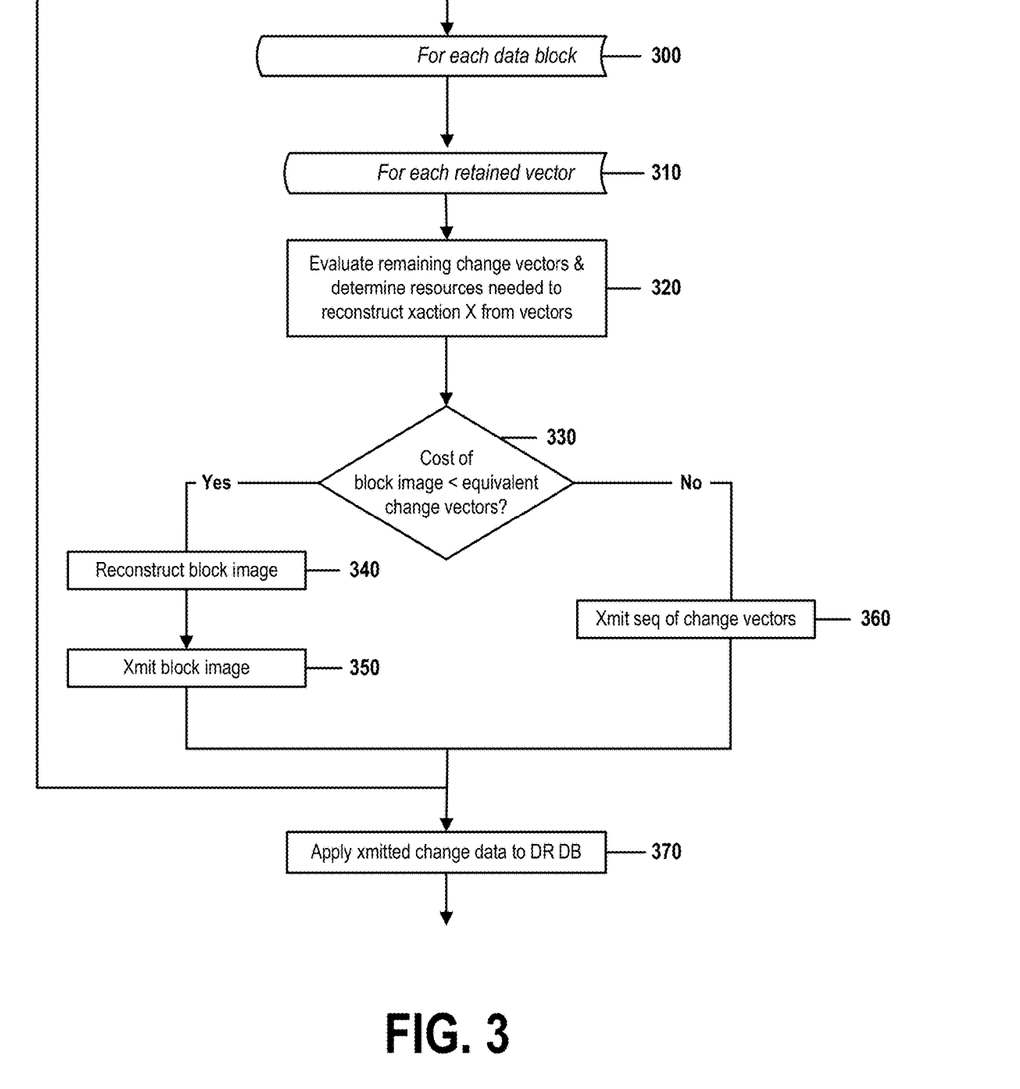
FIG. 3 is a flow chart that describes detailed steps of an embodiment of a method for synchronizing a disaster recovery system of a database in accordance with embodiments of the present invention.

In some embodiments, the method of FIG. 2 may run continuously, so long as the database is operational, and at times identified by a schedule or by an occurrence of a condition, the processor may perform the method of FIG. 3 on a set or subset of the change vectors accumulated during the processor's performance of the method of FIG. 2.

In other embodiments, the processor may initiate the method of FIG. 3 by actively pulling a set or subset of a set of change vectors accumulated or previously stored by performance of a method of FIG. 2.

FIG. 3 is a flow chart that describes detailed steps of an embodiment of a method for synchronizing a disaster-recovery system of a database in accordance with embodiments of the present invention. FIG. 3 comprises steps 300-370.

Step 300 initiates an outer iterative procedure of steps 300-360. Each iteration of this outer procedure determines a more efficient way to communicate synchronizing information to the disaster-recovery system, wherein the synchronizing information comprises information about transactions associated with one data block of the database.

In some embodiments, this iterative procedure is performed once for each data block of the database that has been changed by a logged transaction. In some embodiments, this iterative procedure is performed once for every data block of the database, regardless of whether a block has been changed by a logged transaction since a previous performance of the iterative procedure, or of the method of FIG. 3.

Step 310 initiates an inner iterative procedure of steps 310-320. Each iteration of this inner iterative procedure considers all change vectors generated in step 220 and retained in step 250. In some embodiments, this procedure will comprise selecting a subset of these retained change vectors, wherein the subset comprises only those vectors that are associated with transactions that affect the current data block being considered by the current iteration of the outer iterative procedure of steps 300-360.

In step 320, the processor identifies and aggregates resources needed to reconstruct changes to the current data block, wherein each change is associated with one retained vector. Each iteration of step 320 considers an effect of the current retained vector, being considered by the current iteration of the inner iterative process of steps 310-320, upon the current data block, being considered by the current iteration of the outer iterative process of steps 300-360.

In some embodiments, a change vector is considered in step 320 only if it has been identified to have effected a change upon the current data block. In other embodiments, the processor in step 320 first determines whether the current change vector has been identified to have effected a change upon the current data block, and if the processor determines that the vector has not effected such a change, it concludes the current iteration of the inner iterative process without further evaluation.

in step 320, the processor may perform an implementation-dependent procedure that may comprise a combination of subtasks that allow the processor to identify a type of resource consumption deemed relevant to the goals of the embodiment. The processor may, for example, determine whether the current vector is associated with a transaction that adds a large amount of data to the database. Because sending such a transaction to a disaster-recovery system might impose a burdensome load on a network or other communications mechanism connected to the disaster-recovery system, such a transaction might be associated with greater resource consumption than a transaction that is associated with a large amount of data.

In some cases, a transaction may be associated with more than one change vector, such as would be the case when a single transaction changes multiple blocks, or when a single complex transaction performs a sequence of changes.

If a transaction is associated with more than one change vector, the processor in step 320 may aggregate the effects or resource requirements of each vector of the more than one change vectors.

In some embodiments, the processor in step 320 may merely count the number of retained vectors associated with transactions that effect a change on the current data block. Such an embodiment may assume that a resource consumption of a series of transactions is proportional to a number of change vectors associated with that series of transactions.

The inner iterative procedure of steps 310-320 repeats it this manner, performing one iteration for each vector to be considered. During each iteration, each vector is characterized by an amount of resource consumption required in order to reconstruct a transaction associated with the vector. When all vectors have been so considered, the procedure of steps 310-320 concludes and the method of FIG. 3 continues with step 330.

At the conclusion of the last iteration of the inner procedure of steps 310-320, the processor will have estimated total resource consumption necessary to use change vectors to synchronize the current data block under consideration with an analogous data block comprised by the disaster-recovery system's backup database. This resource consumption comprises a consumption of resources necessary to transmit to the disaster recovery system all such change vectors, and all additional data necessary to perform operations identified by the change vectors upon the current data block.

In some embodiments, this total resource consumption may be a function of the total amount of data that must be transmitted to the disaster-recovery system in order to use change vectors to synchronize the content or state of the current data block with the content or state of an analogous data block comprised by the disaster-recovery system's backup database.

In example, if twelve transactions together updated one kilobyte of data comprised by a production database's data block [00012947], transmitting the change vectors associated with those twelve transactions, along with the kilobyte of data updates, might require 1.5 kilobytes to be transmitted to the disaster-recovery system. Upon receipt of this transmission, the disaster-recovery system would reproduce, in proper order, the operations identified by the change vectors needed to update an appropriate data block of the disaster-recovery's database. At the conclusion of this updating, the appropriate disaster-recovery data block would be identical to, or synchronized with, data block [00012947] of the production database.

In this exemplary embodiment, wherein a "cost" of synchronizing the database by means of change vectors is associated with an amount of data that must be transmitted to the disaster-recovery system in order to perform the synchronization, the cost to synchronize data block [00012947] would be a function of the transmitted 1.5 kilobytes.

In step 330, the processor compares the cost of synchronizing the current data block by the above method of transmitting change vectors is greater than a cost of synchronizing the current data block by transmitting the entire updated data block stored in the production database to the disaster-recovery system.

In other words, if an embodiment of the present invention determines that communicating an image of the current, updated version of the current data block is less costly than sending the change vectors required in order for the disaster-recovery mechanism to recreate the updated block, then the embodiment would send the image of the data block. For example, if the embodiment has determined that three transactions each altered a data block the embodiment would identify data comprised by the data block after it was altered by the three transactions.
In step 330, the processor would then determine whether it would be more efficient to communicate the updated version of block [0001056F] to the disaster-recovery mechanism than it would be to instead communicate change vectors associated with the three transactions.

In some embodiments, this comparison is made by comparing the amount of data that must be transmitted to the disaster-recovery system order to perform the synchronization by means of the above change-vector method to the size of the data block that would otherwise be transmitted to the disaster-recovery system.

In an earlier example, if data block [00012947] is smaller than the 1.5 kilobytes needed to synchronize the current state of data block [00012947] in the production database with an analogous data block in the backup database, then the processor in step 330 determines that transmitting the block itself would be more efficient than transmitting the corresponding change vectors and transaction data associated with transactions that affected the content of data block [00012947]. ho this case, the method of FIG. 3 continues with step 360.

If, however, data block [00012947] is larger than 1.5 kilobytes, then the processor in step 330 determines that transmitting the block to the disaster-recovery system would be less efficient than transmitting the corresponding change vectors and transaction data. In this case, the method of FIG. 3 continues with steps 340-350.

In other embodiments, the processor in step 330 compares costs by comparing an amount of processor, memory, storage, or other types of resources may be required by each synchronization method, or by comparing extrinsic resources, such a elapsed time, resource-licensing costs, or environmental costs. In some embodiments, the processor in step 330 may compare combinations of such costs, or of other types of costs relevant to the business.

Some embodiments of the present invention consider communicating a data block or change vectors only if those vectors are associated with transactions that actually changed or updated contents of the data block. Other embodiments may also communicate, in steps 340-360, one or more data blocks or change vectors, even if the performance of transactions associated with or related to the change vectors effected no changes, or no net change, to the one data blocks.

In step 340, the processor constructs an image of the latest version of the current data block by means known to those skilled in the art. This construction may comprise one or methods that may comprise, but are not limited to: reproducing transactions performed upon an earlier version of the block by performing operations identified by retained change vectors upon an earlier image of the block; copying a current version of the block stored in the production database; or otherwise determining the most current state of the block as a function of transactions that may have affected the contents or state of the block since the last performance of an embodiment of the present invention.

In step 350, the processor transmits the reconstructed block image to the disaster-recovery system, using communications methods and mechanisms known to those skilled in the art.

In step 360, the processor transmits the change vectors and associated data to the disaster-recovery system, in response to the processor in step 340 determining that transmitting the change vectors and associated data is more efficient than transmitting an image of the current data block.

The iterative procedure of steps 300-360 may continue in this manner, performing one iteration for each data block of the production database, or performing one iteration for each data block of the production database that has been altered by a transaction detected in step 200.

In each iteration, the processor may transmit to the disaster-recovery system information that the system needs to synchronize its copy of one data block with an equivalent or analogous data block in the product database.

In some embodiments, more than one such synchronization transmission may be performed in aggregate, concurrently, or otherwise as part of a group. In one example, a variant embodiment of the method of FIG. 3 may not perform steps 350 and 360 until steps 300-340 have been performed for all data blocks, or for all changed data blocks, of the production database. At the conclusion of the last iteration of steps 300-340, the method of FIG. 3 may then transmit change vectors and block images for all such data blocks as an aggregated data transmission.

At the conclusion of the final iteration of the outer iterative procedure of steps 300-360, the processor will have transmitted to the disaster-recovery system all information needed to synchronize the backup database with the production database. This transmitted information may comprise sets of block images that may update blocks that were the subject of a larger number of transactions or of a greater amount of data associated with transactions; and may further comprise sets of change vectors and associated data to update other blocks that were the subject of a smaller number of transactions or of a lesser amount of data associated with transactions.

In step 370, the disaster-recovery system applies the transmitted information to the backup database maintained b the disaster-recovery system. This applying may comprise copying data block images to the backup database order to synchronize a first set of data blocks; and performing operations identified by the transmitted change vectors in order to synchronize a second set of data blocks. In each case, the method selected to synchronize a particular data block will have been selected as a function of the determination in step 330 that the selected method is the more efficient way to update that particular data block.

What is claimed is:

1. A method for synchronizing a disaster-recovery system of a database, the method comprising:
    monitoring a set of transactions associated with the database, where the database comprises a set of data blocks, and where each transaction of the set of transactions identifies an alteration to one or more data blocks of the set of data blocks;
    choosing a subset of transactions of the set of transactions, where each transaction of the subset of transactions identifies an alteration to a first data block of the set of data blocks;
    creating a set of block images, where a first image of the set of block images corresponds to the first data block;
    generating a set of change vectors,
        where each vector of the set of change vectors corresponds to one transaction of the subset of transactions
    updating the first block image as a function of changes made to the first block image by the subset of transactions; and
    determining whether transmitting the updated first block image to the disaster-recovery system is more efficient than transmitting the set of change vectors to the disaster-recovery system, where the determining is a function of comparing a first quantity of data comprised by the updated firm block image to a second quantity of data comprised by the set of change vectors.

2. The method of claim 1, further comprising:
    the processor transmitting either the first block image or the set of change vectors to the disaster-recovery entity as a function of the determining.

3. The method of claim 1, where a first change vector of the set of change vectors corresponds to a first transaction of the subset of transactions, and where the first change vector comprises a block identifier that identifies the first data block and a change identifier that identifies the first transaction.

4. The method of claim 1, where the choosing a subset comprises discarding an undo/redo transaction.

5. The method of claim 1, where the choosing a subset comprises discarding a transaction that was not completed.

6. The method of claim 1, where the choosing a subset comprises discarding a plurality of transactions that do not together effect a net change to data comprised by the first data block.

7. The method of claim 1, where the transmitting is performed only if the updating results in a net change to data comprised by the first data block.

8. The method of claim 1, where the determining is a further function of comparing a first quantity of data, which must be communicated in order to transmit the updated first block image to the disaster-recovery system, to a second quantity of data, which must be communicated in order to transmit the set of change vectors to the disaster-recovery system.

9. The method of claim 1, further comprising providing at least one support service for at least one of creating, integrating, hosting, maintaining, and deploying computer-readable program code in the computer system, where the computer-readable program code in combination with the computer system is configured to implement the monitor, choosing, creating, generating, updating, and determining.

10. A computer program product, comprising a computer-readable hardware storage device having a computer-readable program code stored therein, said program code configured to be executed by a processor of a computer system to implement a method for synchronizing a disaster-recovery system of a database, the method comprising:
    the processor monitoring a set of transactions associated with the database, where the database comprises a set of data blocks, and where each transaction of the set of transactions identifies an alteration to one or more data blocks of the set of data blocks;

the processor choosing a subset of transactions of the set of transactions, where each transaction of the subset of transactions identifies an alteration to a first data block of the set of data blocks;

the processor creating a set of block images, where a first image of the set of block images corresponds to the first data block;

the processor generating a set of change vectors,
where each vector of the set of change vectors corresponds to one transaction of the subset of transactions, the processor updating the first block image as a function of changes made to the first block image by the subset of transactions; and the processor determining whether transmitting the updated first block image to the disaster-recovery system is more efficient than transmitting the set of change vectors to the disaster-recovery system, where the determining is a function of comparing a first quantity of data comprised by the updated first block image to a second quantity of data comprised by the set of change vectors.

11. The computer program product of claim 10, further comprising:
the processor transmitting either the first block image or the set of change vectors to the disaster-recovery entity as a function of the determining.

12. The computer program product of claim 10, where a first change vector of the set of change vectors corresponds to a first transaction of the subset of transactions, and where the first change vector comprises a block identifier that identifies the first data block and a change identifier that identifies the first transaction.

13. The computer program product of claim 10, where the choosing a subset comprises discarding an undo/redo transaction.

14. The computer program product of claim 10, where the choosing a subset comprises discarding a transaction that was not completed.

15. The computer program product of claim 10, where the determining is a further function of comparing a first quantity of data, which must be communicated in order to transmit the updated first block image to the disaster-recovery system, to a second quantity of data, which must be communicated in order to transmit the set of change vectors to the disaster-recovery system.

16. A computer system comprising a processor, a memory coupled to said processor, and a computer-readable hardware storage device coupled to said processor, said storage device containing program code configured to be run by said processor via the memory to implement a method for synchronizing a disaster-recovery system of a database, the method comprising:

the processor monitoring a set of transactions associated with the database, where the database comprises a set of data blocks, and where each transaction of the set of transactions identifies an alteration to one or more data blocks of the set of data blocks;

the processor choosing a subset of transactions of the set of transactions, where each transaction of the subset of transactions identifies an alteration to a first data block of the set of data blocks;

the processor creating a set of block images, where a first image of the set of block images corresponds to the first data block;

the processor generating a set of change vectors,
where each vector of the set of change vectors corresponds to one transaction of the subset of transactions;

the processor updating the first block image as a function of changes made to the first block image by the subset of transactions; and the processor determining whether transmitting the updated first block image to the disaster-recovery system is more efficient than transmitting the set of change vectors to the disaster-recovery system, where the determining is a function of comparing a first quantity of data comprised by the updated first block image to a second quantity of data comprised by the set of change vectors.

17. The computer system of claim 16, further comprising:
the processor transmitting either the first block image or the set of change vectors to the disaster-recovery entity as a function of the determining.

18. The computer system of claim 16, where a first change vector of the set of change vectors corresponds to a first transaction of the subset of transactions, and where the first change vector comprises a block identifier that identifies the first data block and a change identifier that identifies the first transaction.

19. The computer system of claim 16, where the choosing a subset comprises discarding an undo/redo transaction, discarding a transaction that was not completed, or discarding a plurality of transactions that do not together effect a net change to data comprised by the first data block.

20. The computer system of claim 16, where the determining is a function of comparing a first quantity of data, which must be communicated in order to transmit the updated first block image to the disaster-recovery system, to a second quantity of data, which must be communicated in order to transmit the set of change vectors to the disaster-recovery system.

* * * * *